US008312970B2

(12) United States Patent
Mustalahti et al.

(10) Patent No.: US 8,312,970 B2
(45) Date of Patent: Nov. 20, 2012

(54) ELEVATOR ARRANGEMENT

(75) Inventors: Jorma Mustalahti, Hyvinkää (FI); Esko Aulanko, Kerava (FI)

(73) Assignee: Kone Corporation, Helsinki (FI)

( * ) Notice: Subject to any disclaimer, the term of this patent is extended or adjusted under 35 U.S.C. 154(b) by 148 days.

(21) Appl. No.: 11/393,749

(22) Filed: Mar. 31, 2006

(65) Prior Publication Data

US 2006/0231347 A1 Oct. 19, 2006

Related U.S. Application Data

(63) Continuation of application No. PCT/FI2004/000692, filed on Nov. 17, 2004.

(30) Foreign Application Priority Data

Nov. 17, 2003 (FI) ..................................... 20031664
Nov. 24, 2003 (FI) ..................................... 20031722

(51) Int. Cl.
*B66B 11/08* (2006.01)
*B66B 7/00* (2006.01)
*B66B 9/00* (2006.01)
*B23P 11/00* (2006.01)

(52) U.S. Cl. .......... 187/266; 187/414; 187/900; 29/521; 29/525.03

(58) Field of Classification Search .................. 187/266, 187/355, 900; 29/428, 429, 521, 525.05; 248/228.3, 228.7, 231.81, 231.85, 231.9, 248/231.41; *B66B 11/08, 15/02, 19/02, 19/04*
See application file for complete search history.

(56) References Cited

U.S. PATENT DOCUMENTS 1,784,521 A * 12/1930 Gwinn, Jr. et al. ............ 254/415
1,901,635 A * 3/1933 Dunlop ......................... 187/411
2,343,054 A * 2/1944 Gwinn, Jr. et al. ............ 254/415
2,421,172 A * 5/1947 Ulrich et al. .................... 403/20
2,621,357 A * 12/1952 Stuman ........................... 16/422
(Continued)

FOREIGN PATENT DOCUMENTS

DE 1251926 * 4/1965
(Continued)

OTHER PUBLICATIONS

Office Action dated Oct. 20, 2010, for Japanese Patent Application No. 2006-540483.

*Primary Examiner* — Michael Mansen
*Assistant Examiner* — Stefan Kruer
(74) *Attorney, Agent, or Firm* — Harness, Dickey & Pierce, P.L.C.

(57) ABSTRACT

A method for installing, securing, or installing and securing at least one rope pulley of an elevator may include: arranging a set of ropes of the elevator and the at least one rope pulley, in a rigged or unrigged state, near an elevator car of the elevator or in a shaft of the elevator; and detachably mounting the at least one rope pulley to the elevator car, a frame structure of the elevator car, or a guide rail of the elevator car using a quick coupling. The elevator may include the ropes, the at least one rope pulley, the elevator car, and elevator car guide rails. The ropes may pass around the at least one rope pulley. The at least one rope pulley may be adapted to detachably mount to the elevator car, the frame structure, or one of the elevator car guide rails using a quick coupling.

22 Claims, 5 Drawing Sheets

U.S. PATENT DOCUMENTS

| | | | | | |
|---|---|---|---|---|---|
| 3,298,462 | A | * | 1/1967 | Morris | 187/262 |
| 3,614,994 | A | * | 10/1971 | Goodrum | 187/406 |
| 3,957,137 | A | | 5/1976 | Vermette | |
| 4,062,519 | A | * | 12/1977 | Jacobs | 160/331 |
| 4,145,029 | A | * | 3/1979 | Johns | 254/390 |
| 5,000,292 | A | * | 3/1991 | Chapelain et al. | 187/408 |
| 5,035,300 | A | * | 7/1991 | Chapelain et al. | 187/266 |
| 5,333,411 | A | * | 8/1994 | Tschirschwitz et al. | 49/352 |
| 5,533,595 | A | * | 7/1996 | Narumi et al. | 187/266 |
| 5,727,657 | A | * | 3/1998 | Foelix | 187/356 |
| 6,227,993 | B1 | * | 5/2001 | Medebach | 474/144 |
| 6,357,556 | B1 | * | 3/2002 | Pettersson et al. | 187/414 |
| 6,607,339 | B1 | * | 8/2003 | Mangapora | 411/107 |
| 2003/0140562 | A1 | * | 7/2003 | Staser et al. | 49/352 |

FOREIGN PATENT DOCUMENTS

| | | | | |
|---|---|---|---|---|
| EP | 0375208 | | | 6/1990 |
| JP | 05028814 | A | * | 2/1993 |
| JP | 7-5962 | | | 1/1995 |
| JP | 9-55586 | | | 2/1997 |
| JP | 11189378 | A | * | 7/1999 |
| JP | 11-246144 | | | 9/1999 |
| JP | 2003-104651 | | | 4/2003 |
| JP | 2003-128359 | | | 5/2003 |
| WO | 01/44096 | | | 12/2000 |
| WO | WO 2010103165 | A1 | * | 9/2010 |

* cited by examiner

ELEVATOR ARRANGEMENT

PRIORITY STATEMENT

This application is a continuation of International Application No. PCT/FI2004/000692, filed on Nov. 17, 2004 (also known as World Intellectual Property Organization International Publication No. WO 2005/047160 A3), in the Receiving Office of the National Board of Patents and Registration of Finland ("NBPRF"); and claims priority from that application, Finnish Patent Application No. 20031664, filed on Nov. 17, 2003, in the NBPRF, and Finnish Patent Application No. 20031722, filed on Nov. 24, 2003, in the NBPRF.

BACKGROUND

1. Field

The present invention relates to methods for installing, securing, or installing and securing at least one diverting pulley of an elevator, to elevators produced by the methods, to elevators including at least one diverting pulley, and to elevators using one or more quick couplings with at least one diverting pulley.

2. Description of Related Art

At present, a problem in the installation of elevators is tightness of space, because the aim is to make as efficient use of the cross-sectional area of the shaft as possible. Especially in the case of elevators without counterweight, this leads to a very small distance between the car wall and the shaft wall. Moreover, minimizing the shaft spaces both above and below the elevator car leads to problems regarding both installation and construction of the elevator.

In prior-art solutions, for example the diverting pulleys are fixedly mounted e.g. on the car, the counterweight or the frame structure or equivalent. In such solutions, the diverting pulleys have to be removed in connection with both installation of the elevator and maintenance work to be carried out on it.

However, there are considerable drawbacks associated with prior art. In an elevator constructed as described above, both the spaces needed during installation and the spaces needed during maintenance are narrow. In addition, simultaneous removal of the diverting pulleys is about impossible when prior-art devices are used. This leads to difficulties and delays in the installation and maintenance of the elevator.

The object of the present invention is to overcome these drawbacks and achieve a completely new type of solution. The object of the present invention is to enable easy installation of diverting pulleys, sets of diverting pulleys and/or rope pulleys and thus also to allow the use of this solution during maintenance.

The invention is based on a concept according to which the method of installing and/or mounting at least one diverting pulley comprises at least one rope pulley. According to such a method, the diverting pulley together with the ropes is placed near the elevator in the elevator shaft, whereupon the diverting pulley is attached by a quick coupling to a fastening point. Alternatively, the rigged diverting pulley can be placed near the elevator or in the elevator shaft, whereupon the diverting pulley is attached by a quick coupling to a fastening point.

According to the above-described method, the diverting pulley is detached by releasing the quick coupling. When necessary, the elevator car is suspended for maintenance preferably so that it is supported by a tackle or equivalent. Alternatively, the car can be locked in place by other means.

By the method of the invention, an elevator can be installed in a reliable, fast and economical manner. Furthermore, in addition to new buildings, the method of the invention can also be used in modernization projects, and the method is not restricted to any specific elevator type; instead, the method can be used both in elevators without counterweight and in elevators with counterweight. In addition, the method can be utilized in other hoisting arrangements according to need.

SUMMARY

The invention also relates to an installation arrangement according to the preamble of the claim in an elevator comprising at least one diverting pulley mounted in place by means of a frame structure and a roping consisting of a number of ropes, the passage of which has been arranged using at least one set of diverting pulleys. Such an arrangement comprises at least one set of diverting pulleys, which has been arranged to be detachably mounted by means of a quick coupling. The mounting used may be the frame structure, the car, the counterweight, the elevator shaft or equivalent according to need. A releasable set of diverting pulleys is a very advantageous solution because the space available for the pulleys is very small. Therefore, it is very advantageous to have a possibility to move the set of diverting pulleys to a place where there is more space, where it can be released and fastened safely and quickly. It is possible to provide such a space e.g. above the car.

The set of diverting pulleys according to the arrangement consists of at least one diverting pulley and a frame structure or box part and preferably the frame structure or box part consists of at least one box part or part. The box part has preferably been arranged to be detachably secured to at least one diverting pulley. If the box part is composed of more than one part, these can also be advantageously fastened together.

The set of diverting pulleys according to the arrangement preferably comprises an even number of diverting pulleys. In a particularly preferable case, the number of diverting pulleys is two. In such a case, the opposite forces acting on the diverting pulleys advantageously about cancel each other. What remains is preferably only the difference between the opposite forces. Due to its structure, the set of diverting pulleys according to this solution can withstand even large moment forces, such as e.g. the forces caused by the upper and lower riggings, because in practice these almost cancel each other due to the advantageous diverting pulley structure.

Arranged in the frame structure or box part of the set of diverting pulleys of the invention are a mounting element that can be detachably fastened to its counterpart and at least one diverting pulley mounted on the frame structure by means of a quick coupling. The quick coupling in question may be e.g. a so-called key-hole joint lockable by a spring. The spring prevents the frame structure from escaping from the part of the keyhole part of a preferably narrow shape.

It is also possible to attach a detachable guard element to the set of diverting pulleys of the invention to guide the ropes. Alternatively, the guard element also keeps the ropes in position. In addition, the guard element, which is made of any material, preferably e.g. plastic, prevents the entry of rubbish or the like into the set of diverting pulleys, especially into the gap-part between the box parts.

The invention also concerns the use of a quick coupling in an elevator, comprising at least one rope pulley mounted in place by means of at least one frame structure and a set of ropes consisting of a number of ropes, the passage of which has been arranged-using at least one set of diverting pulleys.

In more precise terms, the methods and apparatuses of the invention are described below.

BRIEF DESCRIPTION OF THE DRAWINGS

In the following, the invention will be described in detail with reference to the attached drawings, which illustrate an installation and/or mounting method and an elevator according to the invention.

The invention will now be examined in greater detail with reference to the attached drawings, wherein.

DETAILED DESCRIPTION OF EXAMPLE EMBODIMENTS

Figure 1:
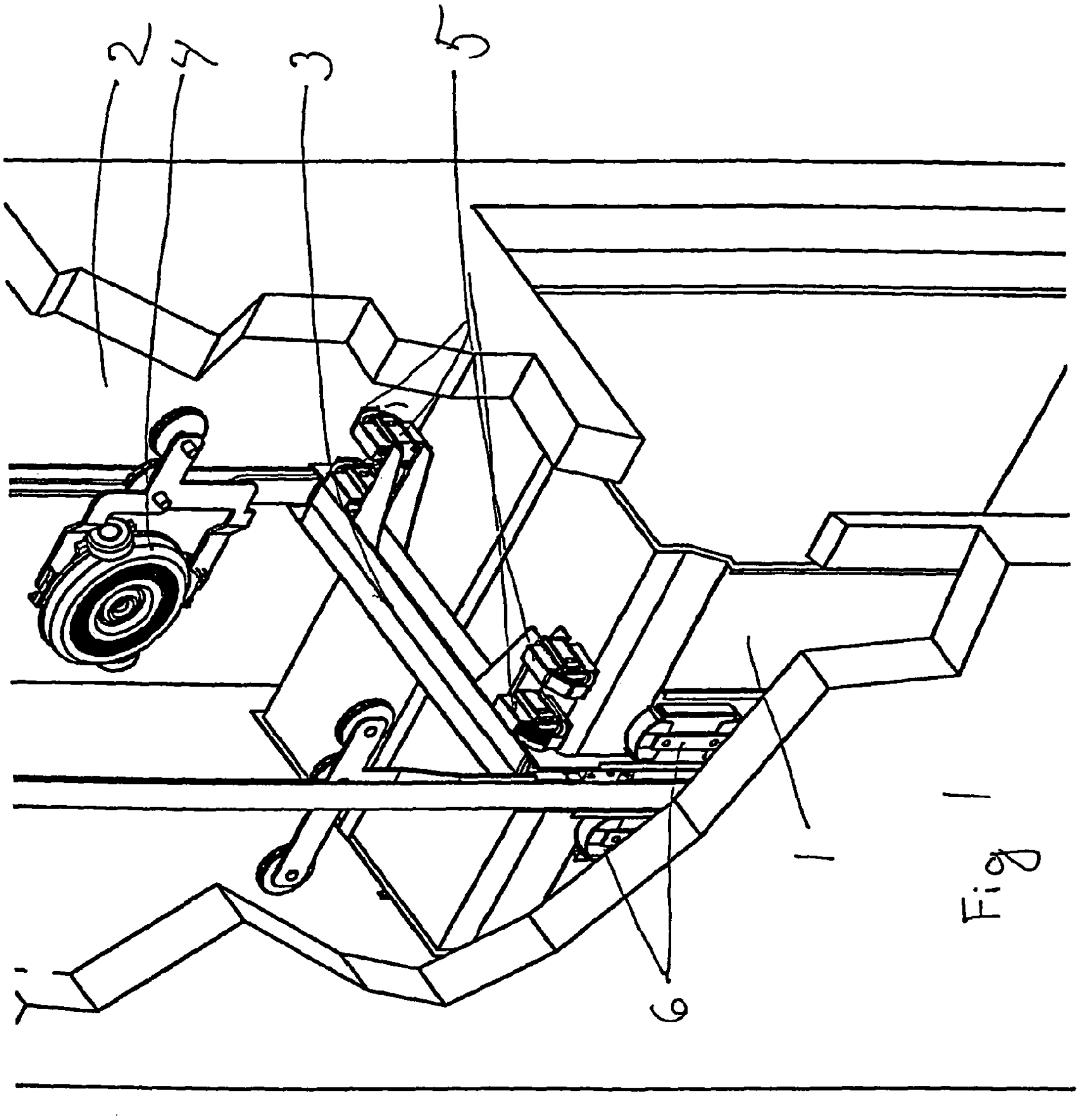
FIG. 1 presents a solution according to the invention in a situation where the elevator is being installed or operated.

FIG. 1 presents an elevator car 1 with a frame structure 3 in an elevator shaft 2. The figure also shows a hoisting machine 4, rope pulleys 5 and sets of diverting pulleys 6. The ropes themselves are not shown to simplify the figure. In this example, the sets of diverting pulleys 6 are mounted on the frame structure 3. Alternatively, the sets of diverting pulleys 6 may naturally be mounted on the guide rail.

Figure 2:
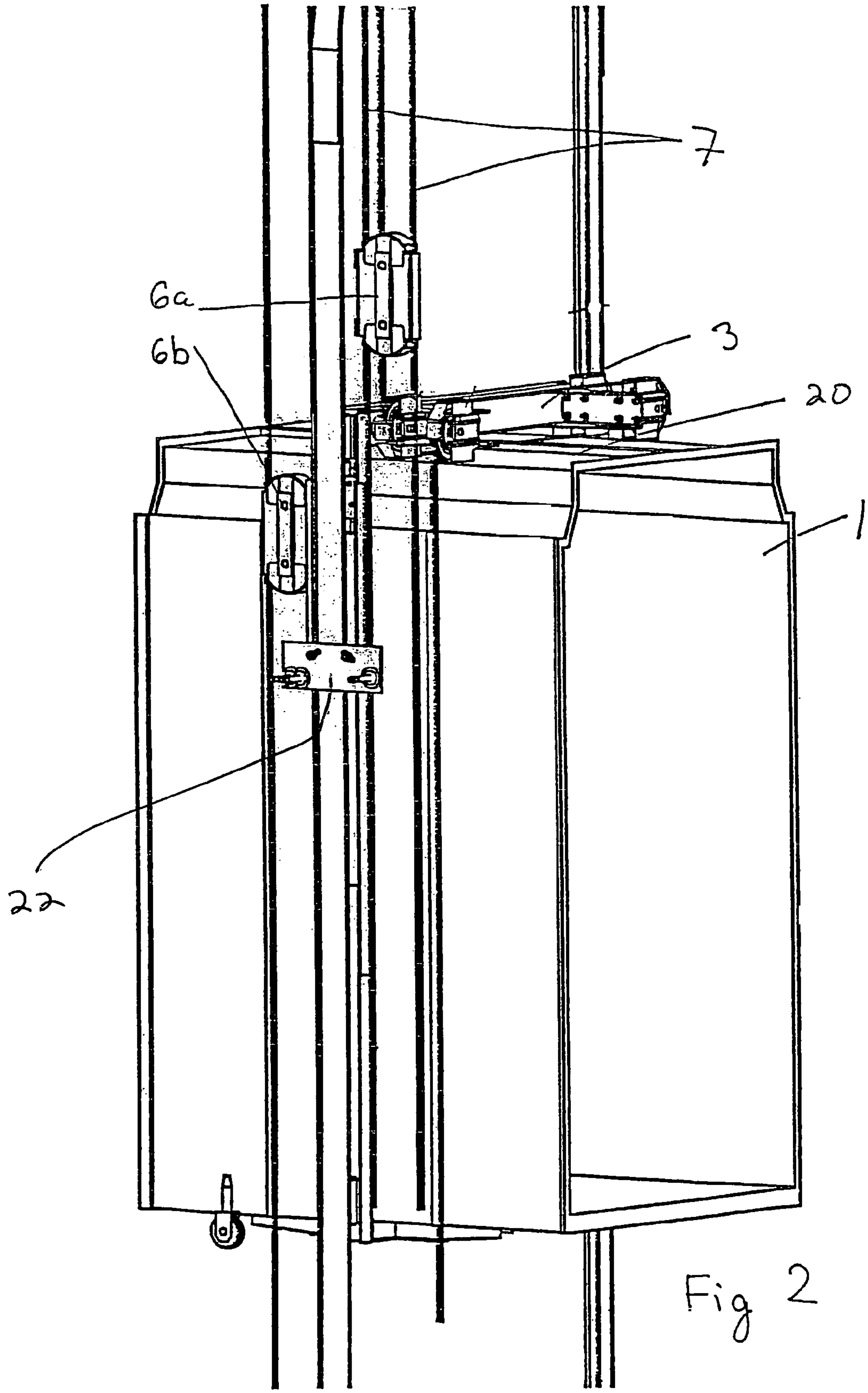
FIG. 2 represents a solution according to the invention for use during maintenance of an elevator.

In FIG. 2, the elevator car 1 with a frame structure 3 is presented in a maintenance situation where a set of diverting pulleys 6*a* has been driven along the ropes 7 to a maintenance position, allowing a serviceman to carry out the maintenance operations safely while standing on the top 20 of the elevator car 1 (a set of diverting pulleys 6*b* is also shown in FIG. 2). In the maintenance situation, elevator car 1 may be supported by maintenance support device 22. Maintenance support device 22 may be, for example, a tackle or equivalent, or the elevator car 1 may be locked in place by other means. A corresponding situation can naturally be utilized when the elevator is being installed. The elevator car 1 may preferably be narrower in its upper part, allowing other devices in the shaft, such as the hoisting machine, which are not shown in FIG. 2, to be more easily disposed in relation to the elevator car 1.

Figure 3:
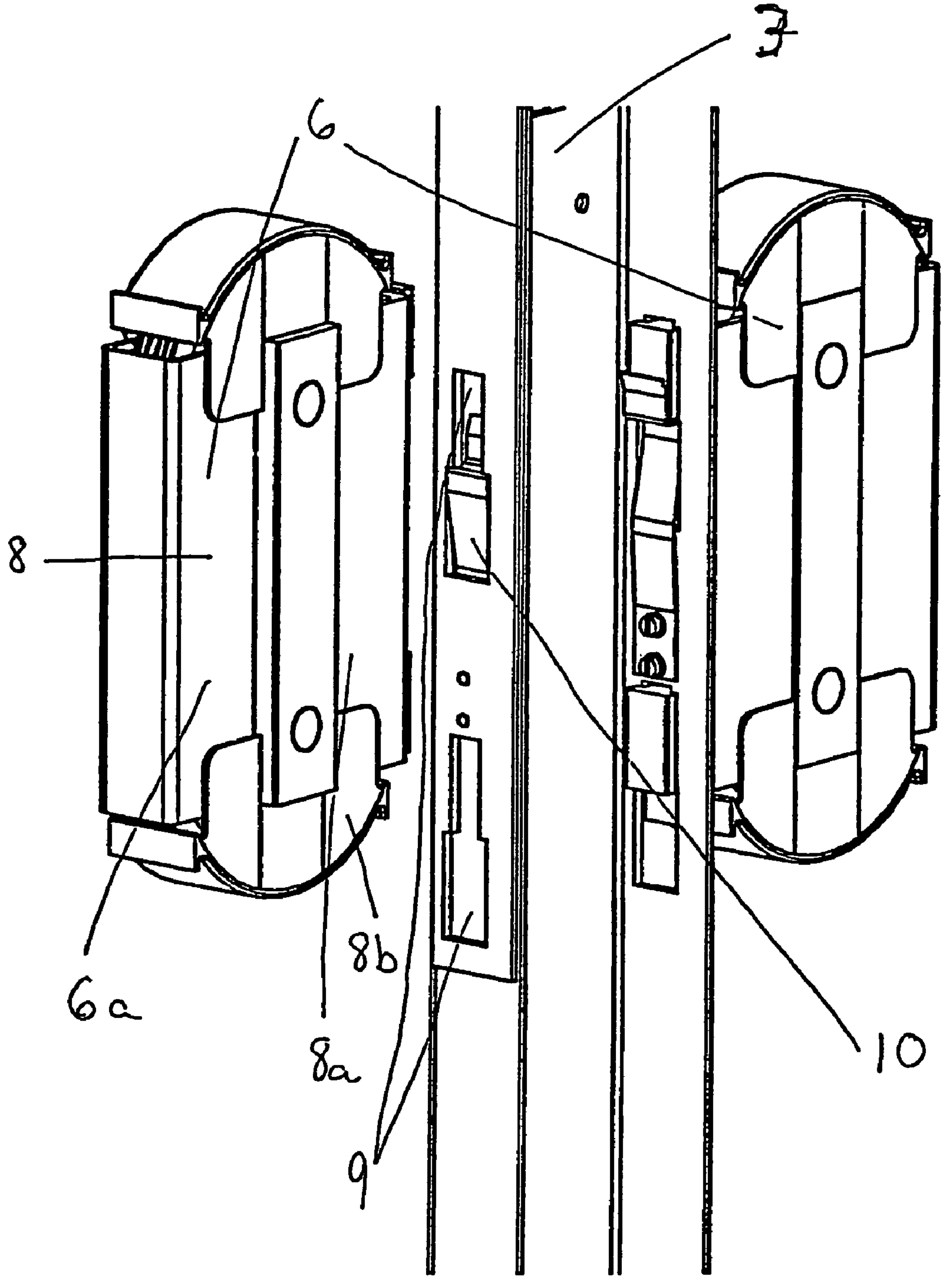
FIG. 3 illustrates the structure of set of diverting pulleys in a dismounting situation.
Figure 4:
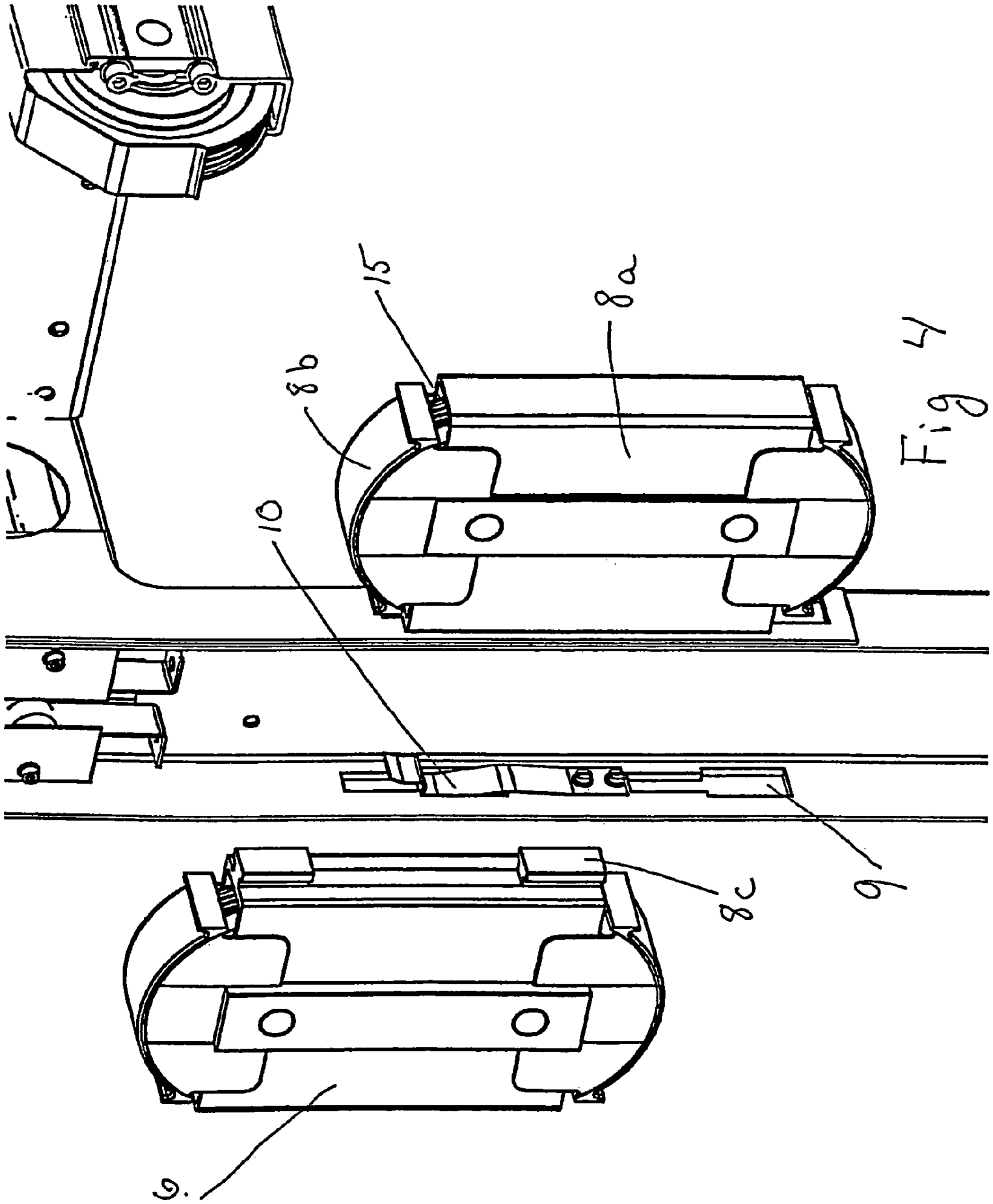
FIG. 4 illustrates the structure of the set of diverting pulleys in a dismounting situation as seen from another direction.

FIG. 3 shows the sets of diverting pulleys 6 and the frame structure 3. In the figure, the set of diverting pulleys 6*a* has been detached from the frame structure 3. The figure also shows the box part 8 of the set of diverting pulleys 6. The box part 8 in the figure consists of more than one part 8*a* and 8*b*. In addition, the figure also shows a hole 9, which preferably is narrower at one edge. The figure shows two holes 9, with a tightening element 10, preferably a spring, mounted in one of them. A so-called keyhole joint as presented in the figure enables easy quick coupling of the set of diverting pulleys even without separate tools. The counterpieces 8*c* on the set of diverting pulleys 6*a*, which are presented in detail in FIG. 4, are placed in the holes 9 and the spring 10 tightens the set of diverting pulleys 6*a* in position. Thus, no separate fastening elements such as bolts are needed at all and the installation can be performed considerably faster. Similarly, an operator may act on the tightening element 10 (e.g., by displacing the tightening element 10 in order to effectively open the respective hole 9) so that the tightening element 10 allows the operator to withdraw the counterpieces 8*c* from the holes 9.

FIG. 4 shows the set of diverting pulleys 6 as seen from another direction. The mounting hole 9 and the spring 10 can now be seen from the other side. In addition, FIG. 4 shows a counterpiece 8*c*, which is provided on the set of diverting pulleys 6 and is placed in the hole 9 in the quick coupling. In this embodiment, the counterpiece 8*c* is preferably an integral part of the box part 8, but naturally it may also be a separate fastening element attached the box part 8. Between the box parts 8*a* and 8*b* is formed a so-called gap 15, which in undesirable conditions may permit the entry of rubbish into the box part 8, which might impede the operation of the set of diverting pulleys 6.

Figure 5A:
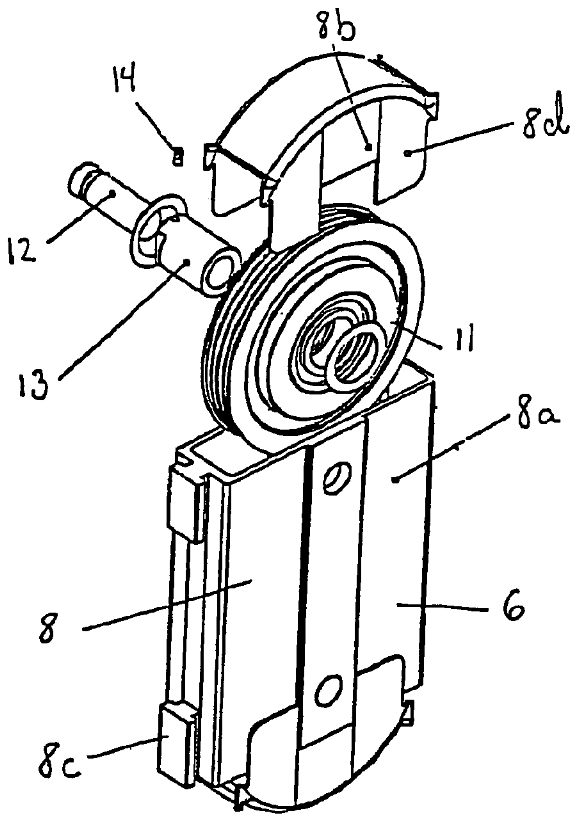
FIG. 5*a* presents the structure of the set of diverting pulleys in a so-called exploded view.

FIG. 5*a* illustrates the assembly of the set of diverting pulleys 6, wherein the box part 8 is composed of several different parts. Box part 8*a* is provided with a counterpiece 8*c* integrated with it, and the separate box part 8*b* is provided with a guard element 8*d* integrated with it, which naturally may also consist of a separate and detachable guard element 8*d*. The guard element 8*d* functions as a gap protector and it both prevents the entry of impurities into the set of diverting pulleys 6 and guides the ropes, which are not shown in the figure. The diverting pulley 11 is mounted on an axle 12 by means of another axle 13, preferably a sleeve and preferably a retainer screw 14. In this way, a compact set of diverting pulleys 6 is achieved that is easy and economical to both manufacture and install.

Figure 5B:
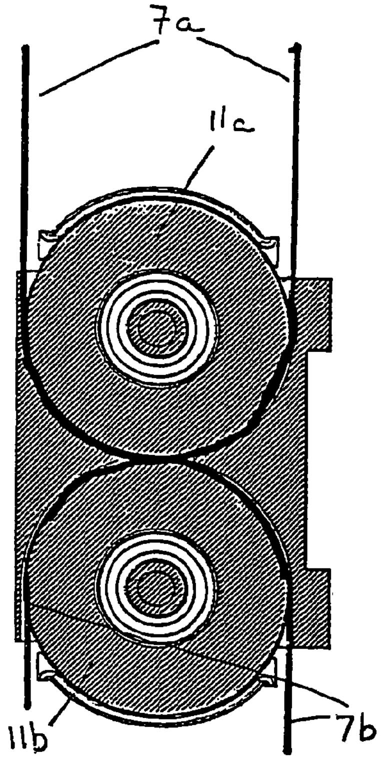
FIG. 5*b* presents a control signal view of the set of diverting pulleys, and FIG. 6 present the structure of the set of diverting pulleys in a so-called exploded view.

FIG. 5*b* presents a sectional view of a set of diverting pulleys 6 in which, in addition to the pulleys 11, are also shown the upper ropes 7*a*, which pass around pulley 11*a*, and the lower ropes 7*b*, which pass around pulley 11*b*. As can be seen from the figure, the set preferably comprises an even number of diverting pulleys, here two pulleys, so the forces produced by the upper and lower ropes advantageously cancel each other and only their difference preferably remains on the set of diverting pulleys.

Figure 6:
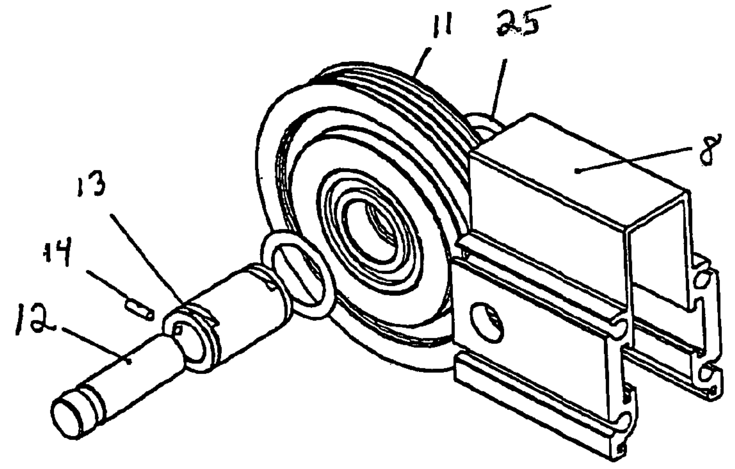

FIG. 6 presents an assembly view of the rope pulley 5, wherein the box part 8 has preferably been made from a profiled element. In addition, FIG. 6 shows the pulley 11, the axle 12, the axle 13 (preferably a sleeve), and retainer screw 14 needed for the mounting of the pulley. If necessary, it is also possible to add a required number of spacers 25 to the structure.

The methods and arrangements of the invention are described above and in the independent claims. Other embodiments of the invention are described above and in the dependent claims. Inventive embodiments are also presented in the description part of the present application. The inventive content disclosed in the application can also be defined in other ways than is done in the claims below. The inventive content may also consist of several separate inventions, especially if the invention is considered in the light of expressed or implicit sub-tasks or in respect of advantages or sets of advantages achieved. Some of the attributes contained in the claims below may be superfluous from the point of view of separate inventive concepts.

It is obvious to the person skilled in the art that the invention is not limited to the embodiments described above, in which the invention has been described by way of example, but that different embodiments of the invention are possible within the scope of the inventive concept defined in the claims presented below.

The invention claimed is:

1. A method for installing, securing, or installing and securing a pulley device of an elevator, the elevator including a set of ropes that includes a plurality of ropes, the pulley device that includes at least one rope pulley and a counterpiece, an elevator car that includes a frame structure, and elevator car guide rails, the method comprising:

arranging the set of ropes and the pulley device, in a rigged or unrigged state, near the elevator car or in a shaft of the elevator; and detachably mounting the pulley device to the frame structure using a quick coupling;

wherein the frame structure includes a hole and a tightening element, wherein the counterpiece, the hole, and the tightening element form the quick coupling, wherein the quick coupling allows an operator to detach the pulley device from the frame structure, by acting on the tightening element, so that the tightening element allows the operator to withdraw the counterpiece from the hole, and wherein the quick coupling allows the operator to mount the pulley device to the frame structure by inserting the counterpiece into the hole in a first direction and sliding the counterpiece in a second direction from a first position within the hole to a second position within the hole, the second direction being different from the first direction, and wherein the tightening element tightens the counterpiece in the hole when the counterpiece is slid to the second position in the hole.

2. An elevator installed using the method of claim 1.

3. The elevator of claim 2, wherein the elevator does not include a counterweight.

4. The elevator of claim 1, wherein the tightening element is a spring member configured to lock the counterpiece in the hole by moving in a direction opposite to the first direction when the counterpiece is slid from the first position to the second position.

5. The elevator of claim 4, wherein the spring member is configured to act in the direction opposite to the first direction when the counterpiece is inserted into the hole.

6. The method of claim 1, further comprising:

supporting the elevator car using a maintenance support device so that work can be performed on the pulley device.

7. One or more pulley devices of an elevator installed, secured, or installed and secured using the method of claim 1.

8. An elevator, comprising:

a set of ropes;

a pulley device;

an elevator car; and elevator car guide rails;

wherein the pulley device includes:

at least one rope pulley; and a counterpiece;

wherein the set of ropes includes a plurality of ropes, wherein the set of ropes passes around the at least one rope pulley, wherein the elevator car includes a frame structure, wherein the frame structure includes a hole and a tightening element, wherein the counterpiece, the hole, and the tightening element form a quick coupling, wherein the quick coupling allows an operator to detach the pulley device from the frame structure, by acting on the tightening element, so that the tightening element allows the operator to withdraw the counterpiece from the hole, wherein the quick coupling allows the operator to mount the pulley device to the frame structure by inserting the counterpiece into the hole in a first direction and sliding the counterpiece in a second direction from a first position within the hole to a second position within the hole, the second direction being different from the first direction, and wherein the tightening element tightens the counterpiece in the hole when the counterpiece is slid to the second position within the hole.

9. The elevator of claim 8, wherein the pulley device further includes at least one box part disposed around the at least one rope pulley.

10. The elevator of claim 9, further comprising:

a detachable guard element;

wherein the at least one box part and the detachable guard element guide the set of ropes around the at least one rope pulley, keep the set of ropes in position on the at least one rope pulley, or guide the set of ropes around the at least one rope pulley and keep the set of ropes in position on the at least one rope pulley.

11. The elevator of claim 8, wherein the at least one rope pulley includes an even number of rope pulleys.

12. The elevator of claim 11, wherein opposing rope forces act on the even number of rope pulleys, and wherein the opposing rope forces substantially cancel each other.

13. The elevator of claim 8, wherein the at least one rope pulley includes two rope pulleys.

14. The elevator of claim 13, wherein opposing rope forces act on the two rope pulleys, and wherein the opposing rope forces substantially cancel each other.

15. The elevator of claim 8, wherein the at least one rope pulley includes a set of diverting pulleys.

16. The elevator of claim 8, wherein opposing rope forces act on the at least one rope pulley, and wherein the opposing rope forces substantially cancel each other.

17. The elevator of claim 8, wherein the elevator does not include a counterweight.

18. The elevator of claim 8, wherein the tightening element includes a spring.

19. A method of performing maintenance on a pulley device of an elevator, the elevator including a set of ropes that includes a plurality of ropes, an elevator car that includes a frame structure, elevator car guide rails, and the pulley device that includes at least one rope pulley and a counterpiece, the pulley device detachably mounted to the frame structure using a quick coupling, the method comprising:

supporting the elevator car using a maintenance support device;

detaching the pulley device from the frame structure using the quick coupling;

working on the pulley device;

remounting the pulley device to the frame structure using the quick coupling;

supporting the elevator car using the at least one rope pulley of the pulley device and the set of ropes; and removing the maintenance support device;

wherein the frame structure includes a hole and a tightening element, wherein the counterpiece, the hole, and the tightening element form the quick coupling, wherein the quick coupling allows an operator to detach the pulley device from the frame structure, by acting on the tightening element, so that the tightening element allows the operator to withdraw the counterpiece from the hole, wherein the quick coupling allows the operator to remount the pulley device to the frame structure by inserting the counterpiece into the hole in a first direction and sliding the counterpiece in a second direction from a first position within the hole to a second position within the hole, the second direction being different from the first direction, and wherein the tightening element tightens the counterpiece in the hole when the counterpiece is slid to the second position in the hole.

20. An elevator maintained using the method of claim 19.

21. The elevator of claim 20, wherein the elevator does not include a counterweight.

22. An elevator, comprising:

a set of ropes;

a pulley device;

an elevator car; and elevator car guide rails;

wherein the pulley device includes:

at least one rope pulley; and a counterpiece;

wherein the set of ropes includes a plurality of ropes, wherein the set of ropes passes around the at least one rope pulley, wherein the elevator car includes a frame structure, wherein the frame structure includes a hole and a tightening element, wherein the counterpiece, the hole, and the tightening element form a quick coupling, wherein the quick coupling allows an operator to detach the pulley device from the frame structure, by acting on the tightening element, so that the tightening element allows the operator to withdraw the counterpiece from the hole, wherein the quick coupling allows the operator to remount the pulley device to the frame structure, by inserting the counterpiece into the hole in a first direction and sliding the counterpiece in a second direction from a first position within the hole to a second position within the hole, the second direction being different from the first direction, and wherein the hole and tightening element form a keyhole joint.

* * * * *